United States Patent
Farley et al.

(10) Patent No.: US 11,480,392 B2
(45) Date of Patent: Oct. 25, 2022

(54) HEAT EXCHANGER TRANSFER TUBES

(71) Applicant: Rheem Manufacturing Company, Atlanta, GA (US)

(72) Inventors: Darryl Farley, Fayetteville, AR (US); Shawn Reed, Charleston, AR (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 359 days.

(21) Appl. No.: 16/517,176

(22) Filed: Jul. 19, 2019

(65) Prior Publication Data

US 2021/0018270 A1   Jan. 21, 2021

(51) Int. Cl.
| | |
|---|---|
| F28D 7/16 | (2006.01) |
| F28D 3/02 | (2006.01) |
| F24H 3/00 | (2022.01) |
| F24H 3/02 | (2022.01) |
| F02B 29/04 | (2006.01) |
| F01P 5/06 | (2006.01) |

(52) U.S. Cl.
CPC .......... *F28D 7/1615* (2013.01); *F02B 29/045* (2013.01); *F24H 3/00* (2013.01); *F24H 3/02* (2013.01); *F24H 3/025* (2013.01); *F28D 3/02* (2013.01); *F01P 5/06* (2013.01)

(58) Field of Classification Search
None
See application file for complete search history.

(56) References Cited

U.S. PATENT DOCUMENTS

| | | | | |
|---|---|---|---|---|
| 4,807,588 A | * | 2/1989 | Bentley | F24H 3/105 126/110 R |
| 5,322,050 A | * | 6/1994 | Lu | F24H 8/00 126/110 R |
| 5,347,980 A | * | 9/1994 | Shellenberger | F24H 3/087 126/110 R |
| 5,375,586 A | * | 12/1994 | Schumacher | F24H 8/006 126/110 R |
| 5,408,986 A | * | 4/1995 | Bigham | F24H 9/1881 126/110 R |
| 5,704,343 A | * | 1/1998 | Ahn | F24H 8/006 126/110 R |
| 5,749,355 A | * | 5/1998 | Roan | F24H 8/00 126/110 R |
| 6,006,741 A | * | 12/1999 | Daddis, Jr. | F24H 8/00 126/110 R |
| 7,036,498 B2 | * | 5/2006 | Riepenhoff | F24H 8/006 126/110 R |

(Continued)

*Primary Examiner* — Avinash A Savani
*Assistant Examiner* — Deepak A Deean
(74) *Attorney, Agent, or Firm* — Eversheds Sutherland (US) LLP (57) ABSTRACT

A transfer tube for a thermal transfer device can include at least one wall having an inner surface and an outer surface, where the inner surface forms a cavity, where the at least one wall further has a first end and a second end. The first end can be configured to couple to a terminus of a heat exchanger of the thermal transfer device. The second end can be configured to couple to a collector box of the thermal transfer device. At least a portion of the at least one wall can be disposed in a vestibule of the thermal transfer device. The cavity can be configured to simultaneously receive a first fluid that flows from the first end to the second end and a second fluid that flows from the second end to the first end.

11 Claims, 11 Drawing Sheets

(56) References Cited

U.S. PATENT DOCUMENTS

| | | | |
|---|---|---|---|
| 8,056,553 B2* | 11/2011 | Khan | F24H 8/006 126/116 R |
| 10,145,581 B2* | 12/2018 | Khan | F24H 8/006 |
| 2008/0314375 A1* | 12/2008 | Khan | F24H 8/006 126/116 R |
| 2012/0055465 A1* | 3/2012 | Khan | F24H 8/006 126/99 R |
| 2013/0112384 A1* | 5/2013 | Naruse | F24H 9/146 165/173 |

* cited by examiner

HEAT EXCHANGER TRANSFER TUBES

TECHNICAL FIELD

Embodiments described herein relate generally to heat exchangers, and more particularly to transfer tubes for heat exchangers.

BACKGROUND

Heat exchangers, boilers, combustion chambers, water heaters, and other similar devices (generally called heat exchangers or vessels herein) control or alter thermal properties of one or more fluids. In some cases, tubes (also called heat exchanger tubes or HX tubes) disposed within these devices are used to transfer a fluid through a volume of space, thereby altering the thermal properties of the fluid. The temperature of the fluid can increase or decrease, depending on how the heat exchanger is configured.

SUMMARY

In general, in one aspect, the disclosure relates to a transfer tube for a thermal transfer device. The transfer tube can include at least one wall having an inner surface and an outer surface, where the inner surface forms a cavity, where the at least one wall further has a first end and a second end. The first end can be configured to couple to a terminus of a heat exchanger of the thermal transfer device. The second end can be configured to couple to a collector box of the thermal transfer device. At least a portion of the at least one wall can be disposed in a vestibule of the thermal transfer device. The cavity can be configured to receive a first fluid that flows from the first end to the second end. The cavity can further be configured to receive a second fluid that flows from the second end to the first end. At least one wall can be configured to receive the first fluid and the second fluid simultaneously.

In another aspect, the disclosure can generally relate to a thermal transfer device that includes a main chamber and a vestibule disposed adjacent to the main chamber. The main chamber can include a plurality of heat exchanger tubes through which a first fluid flows, where each heat exchanger tube comprises an entrance and an exit. The main chamber can also include a blower assembly that blows a second fluid across the plurality of heat exchanger tubes. The vestibule can include an inducer and a burner assembly coupled to the entrance of the plurality of heat exchanger tubes. The vestibule can also include a collector box that receives the first fluid and removes condensation from the first fluid. The vestibule can further include a first transfer tube having at least one first wall having a first inner surface and a first outer surface, where the first inner surface forms a first cavity, where the at least one first wall further has a first end and a second end. The first end of the first transfer tube can be coupled to the exit of at least one of the plurality of heat exchanger tubes positioned in the main chamber. The second end of the first transfer tube can be coupled to the collector box in the vestibule. The transfer tube can provide the first fluid to the collector box. The transfer tube can transport the condensation from the collector box to a drain proximate to the exit of the at least one of the plurality of heat exchanger tubes.

These and other aspects, objects, features, and embodiments will be apparent from the following description and the appended claims.

BRIEF DESCRIPTION OF THE DRAWINGS

The drawings illustrate only example embodiments of transfer tubes for heat exchangers of climate control units and are therefore not to be considered limiting in scope, as transfer tubes for heat exchangers may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, methods, and devices for transfer tubes for heat exchangers of climate control devices (e.g., air conditioning units, furnaces) or other types of thermal transfer devices. Example embodiments can be directed to any of a number of thermal transfer devices, including but not limited to furnaces, boilers, condensing boilers, traditional heat exchangers, and water heaters. Further, one or more of any number of fluids can flow through example transfer tubes. Examples of such fluids can include, but are not limited to, water, deionized water, steam, glycol, and dielectric fluids.

Example embodiments can be pre-fabricated or specifically generated (e.g., by shaping a malleable body) for a particular heat exchanger and/or environment. In other words, heat exchangers can be specifically designed to include example transfer tubes and/or existing heat exchangers can be retrofitted to accommodate example transfer tubes.

The transfer tubes (or components thereof) described herein can be made of one or more of a number of suitable materials and/or can be configured in any of a number of ways to allow the transfer tubes (or devices (e.g., furnace, boiler, heat exchanger) in which the transfer tubes are disposed) to meet certain standards and/or regulations while also maintaining reliability of the transfer tubes, regardless of the one or more conditions under which the transfer tubes can be exposed. Examples of such materials can include, but are not limited to, aluminum, stainless steel, ceramic, fiberglass, glass, plastic, and rubber.

As discussed above, heat exchangers that include example transfer tubes can be subject to complying with one or more of a number of standards, codes, regulations, and/or other requirements established and maintained by one or more entities. Examples of such entities can include, but are not limited to, the American Society of Mechanical Engineers (ASME), the Tubular Exchanger Manufacturers Association (TEMA), the American Society of Heating, Refrigeration and Air Conditioning Engineers (ASHRAE), Underwriters' Laboratories (UL), the National Electric Code (NEC), the Institute of Electrical and Electronics Engineers (IEEE), and the National Fire Protection Association (NFPA). Example transfer tubes allow a heat exchanger to continue complying with such standards, codes, regulations, and/or other requirements. In other words, example transfer tubes, when used in a heat exchanger, do not compromise compliance of the heat exchanger with any applicable codes and/or standards.

Any example transfer tubes, or portions thereof, described herein can be made from a single piece (e.g., as from a mold, injection mold, die cast, 3-D printing process, extrusion process, stamping process, crimping process, and/or other prototype methods). In addition, or in the alternative, example transfer tubes (or portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removably, slidably, and threadably.

As described herein, a user can be any person that interacts with transfer tubes or heat exchangers in general. Examples of a user may include, but are not limited to, an engineer, a maintenance technician, a mechanic, an employee, a visitor, an operator, a consultant, a contractor, and a manufacturer's representative. Example transfer tubes are coupled to one or more components of a heat exchanger using one or more of a number of coupling features. As used herein, a "coupling feature" can couple, secure, fasten, abut, and/or perform other functions aside from merely coupling.

A coupling feature as described herein can allow one or more sections of a transfer tube to become coupled, directly or indirectly, to another portion (also called sections herein) of the transfer tube and/or a heat exchanger. A coupling feature can include, but is not limited to, a snap, a clamp, a portion of a hinge, an aperture, a recessed area, a protrusion, a slot, a spring clip, a tab, a detent, a compression fitting, swage or expansion process, and mating threads. One portion of an example transfer tube can be coupled to a component (e.g., a header, a collector box) of a heat exchanger and/or another portion of the transfer tube by the direct use of one or more coupling features.

In addition, or in the alternative, a portion of an example transfer tube can be coupled to another component of a heat exchanger and/or another portion of the transfer tube using one or more independent devices that interact with one or more coupling features disposed on a component of the transfer tube. Examples of such devices can include, but are not limited to, a swage, an expansion, a weld, a pin, a hinge, a fastening device (e.g., a bolt, a screw, a rivet), epoxy, adhesive, and a spring. One coupling feature described herein can be the same as, or different than, one or more other coupling features described herein. A complementary coupling feature as described herein can be a coupling feature that mechanically couples, directly or indirectly, with another coupling feature.

Any component described in one or more figures herein can apply to any other figures having the same label. In other words, the description for any component of a figure can be considered substantially the same as the corresponding component described with respect to another figure. The numbering scheme for the components in the figures herein parallel the numbering scheme for corresponding components described in another figure in that each component is a three digit number and corresponding components have identical last two digits. For any figure shown and described herein, one or more of the components may be omitted, added, repeated, and/or substituted. Accordingly, embodiments shown in a particular figure should not be considered limited to the specific arrangements of components shown in such figure.

Example embodiments of transfer tubes for heat exchangers will be described more fully hereinafter with reference to the accompanying drawings, in which example embodiments of transfer tubes for heat exchangers are shown. Transfer tubes for heat exchangers may, however, be embodied in many different forms and should not be construed as limited to the example embodiments set forth herein. Rather, these example embodiments are provided so that this disclosure will be thorough and complete, and will fully convey the scope of transfer tubes for heat exchangers to those of ordinary skill in the art. Like, but not necessarily the same, elements (also sometimes called components) in the various figures are denoted by like reference numerals for consistency.

Terms such as "first," "second," "top," "bottom," "left," "right," "end," "back," "front," "side", "length," "width," "inner," "outer," "above", "lower", and "upper" are used merely to distinguish one component (or part of a component or state of a component) from another. Such terms are not meant to denote a preference or a particular orientation. Such terms are not meant to limit embodiments of transfer tubes for heat exchangers. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1A:
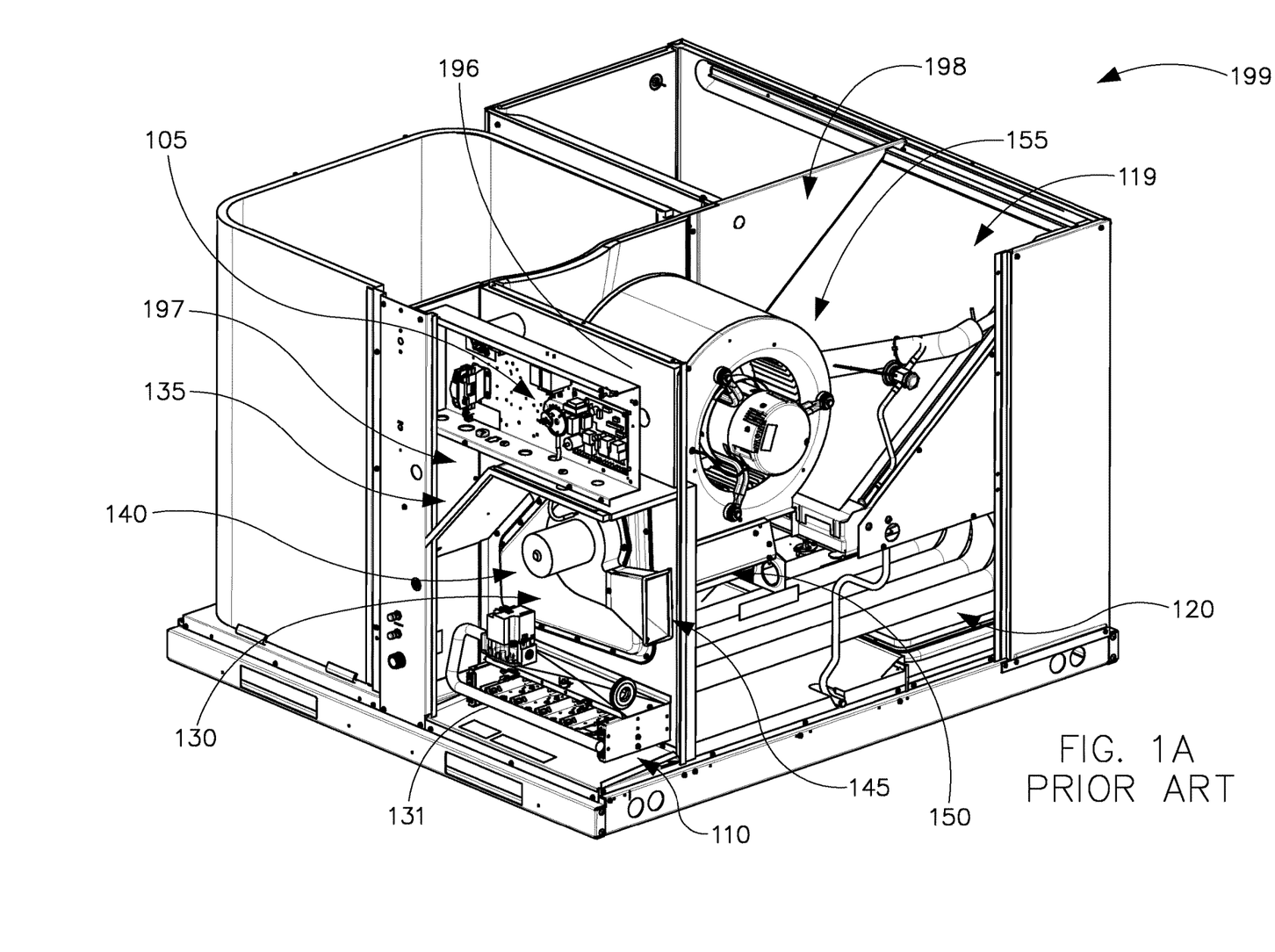
FIGS. 1A through 1D show various views of a climate control unit currently used in the art and with which example embodiments can be used.
Figure 1B:
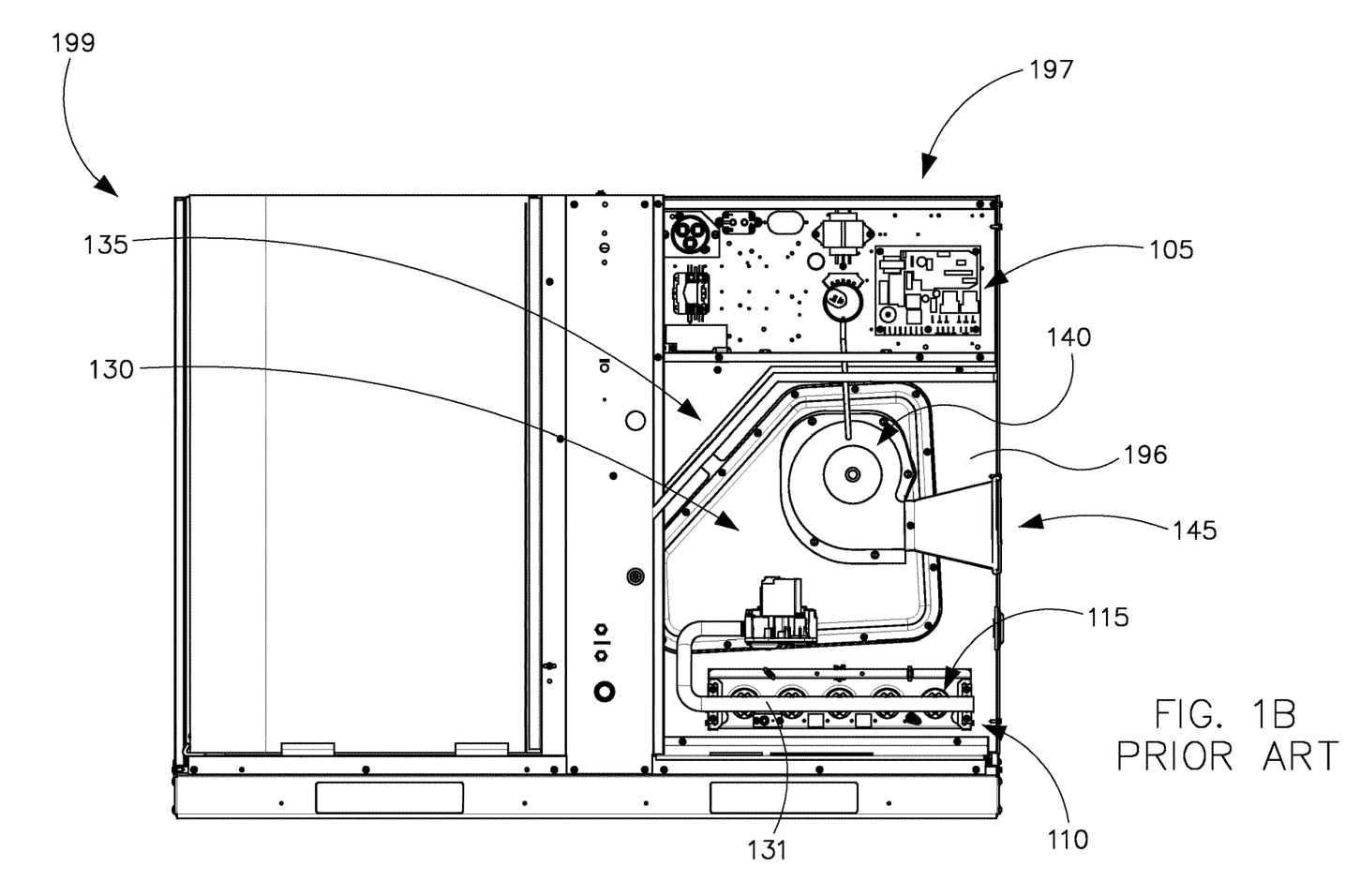
Figure 1C:
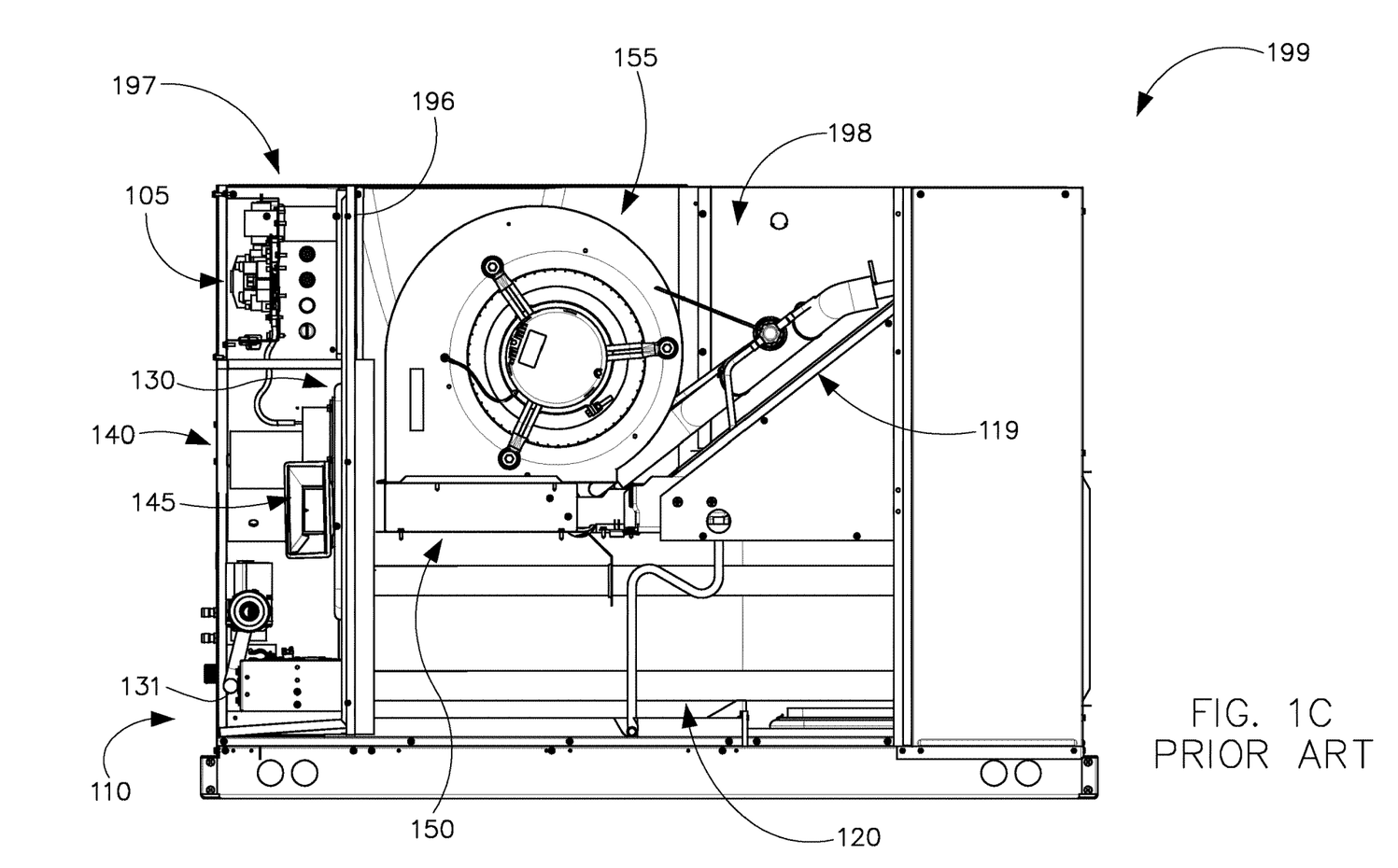
Figure 1D:
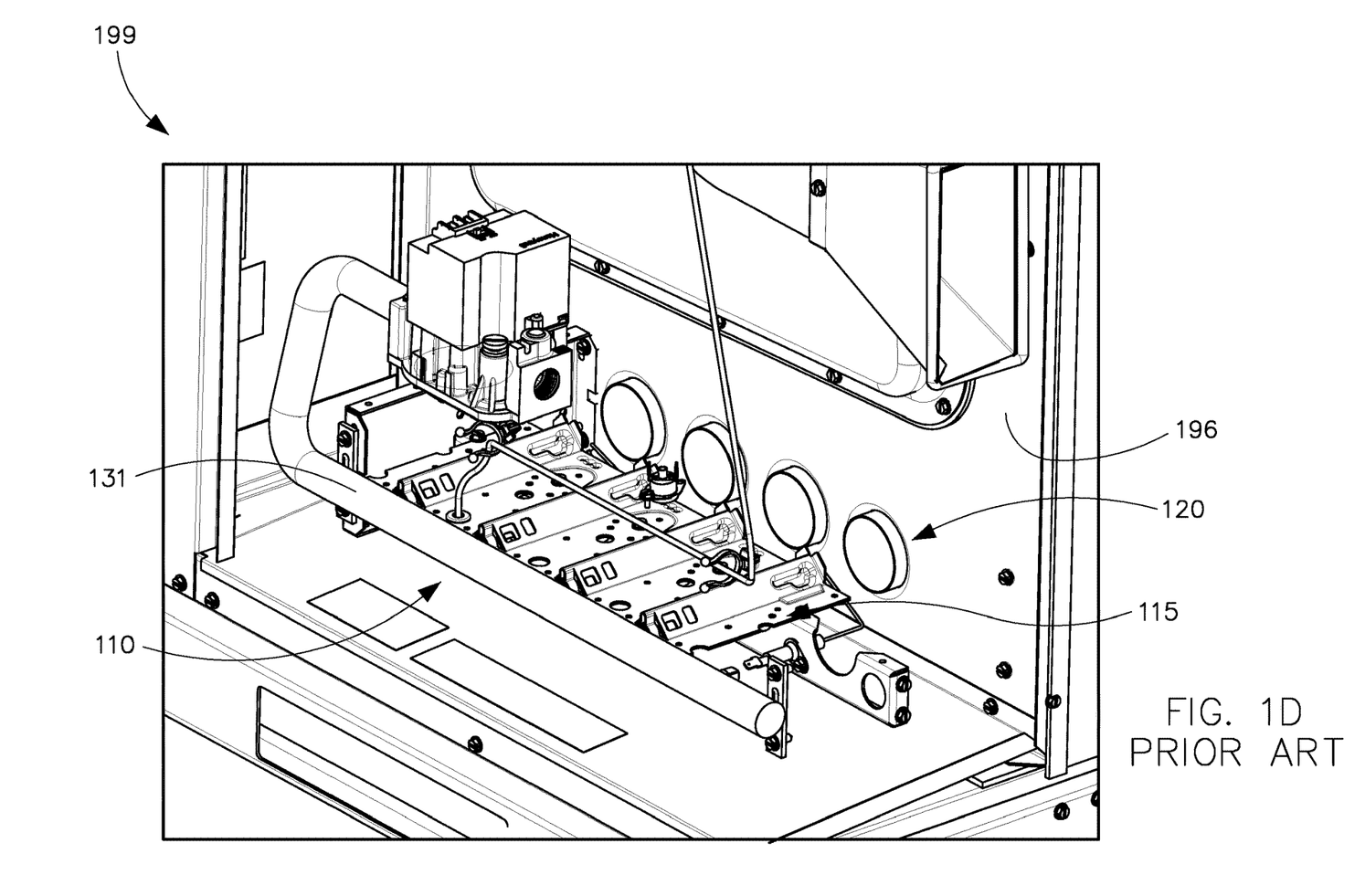

FIGS. 1A through 1D show various views of a climate control unit 199 currently used in the art and with which example embodiments can be used. Specifically, FIG. 1A shows a semi-cross-sectional perspective view of the climate control unit 199. FIG. 1B shows a cross-sectional front view of the climate control unit 199. FIG. 1C shows a cross-sectional side view of the climate control unit 199. FIG. 1D shows a detailed perspective view of a portion of the primary tubes 110 of the climate control unit 199. In this case, the climate control unit 199 is capable of providing heating and air conditioning services.

Referring to FIGS. 1A through 1D, the climate control unit 199 in this case is a furnace. The climate control unit 199 includes one or more of any number of components. For example, in this case, the climate control unit 199 of FIGS. 1A through 1D includes at least one inner wall 196 that divides the interior of the climate control unit 199 into a main chamber 198 and a vestibule 197. The main chamber 198 of the climate control unit 199 is a space in which heat is transferred from one fluid to another. The main chamber 198 of the climate control unit 199 of FIGS. 1A through 1D includes a blower assembly 155, a shelf 150 on which the blower assembly 155 is disposed, and multiple heat exchanger tubes 120.

The vestibule 197 of the climate control unit 199 of FIGS. 1A through 1D includes a burner assembly 110 (which includes one or more burners 115), a collector box 130, a fuel line 131, an inducer 140, an exhaust vent 145, a barrier 135, and a controller 105. In this case, the barrier 135 separates the controller 105 from the rest of the equipment in the vestibule 197. The vestibule 197 is separated from the air stream generated by the blower assembly 155. The blower assembly 155 pushes air from above the blower shelf 150 to the portion of the main chamber 198 below the blower shelf 150 so that the air pushes across the heat exchanger tubes 120. The portion of the main chamber 198 above the blower shelf 150 is under negative pressure, and the portion of the main chamber 198 below the blower shelf 150 is under positive pressure. The vestibule 197 is under negative pressure relative to inside the heat exchanger tubes 120, inside the collector box 130, and the inducer 140. In other words, the inducer 140 provides a negative pressure in relation to all of the other components of the climate control unit 199.

When in heating mode, the process of combusting a first fluid (e.g., natural gas) to heat another fluid (e.g., air) in the climate control unit 199 of FIGS. 1A through 1D begins at the burner assembly 110 in the vestibule 197, where the first fluid interacts with a flame generated by each of the burners 115. For example, a mixture of a gaseous fuel (e.g., natural gas, propane, butane) and air can be used to transfer heat to a fluid (e.g., air, water), and the resulting heated fluid (e.g., air, water, steam) can be used for some other process or purpose. The gaseous fuel can be brought to the burner assembly 110 by the fuel line 131. In the context of a furnace, the climate control unit 199 is used to heat air, which is then circulated through a building (e.g., a house, an office space). In some cases, the fuel can be premixed with some other component, such as air. For example, the fuel/air mixture can be introduced into the burner assembly 110.

Once inside the burner assembly 110, each of the burners 115 can apply a flame to the fuel/air mixture to ignite and raise the temperature of the fuel/air mixture, resulting in combustion and burning of the fuel/air mixture. In this case, as shown in FIG. 1D, there are four burners 115, and each burner 115 of the burner assembly 110 feeds the heated fuel/air mixture into an end of a heat exchanger tube 120. From there, the resulting hot gases (byproducts of the combustion of the fuel/air mixture) can be directed into the entrance (the end coupled to the burners 115) of the various heat exchanger tubes 120 in the main chamber 198. These heat exchanger tubes 120 are placed below the blower shelf 150 and often are laid out in a non-linear, sloped arrangement to maximize the amount of surface area exposed in the main chamber 198.

After flowing through the heat exchanger tubes 120, the remainder of the fuel/air mixture leaves the exit (the end coupled to the collector box 130 or tubing thereto) of the heat exchanger tubes 120 and travels to the collector box 130 in the vestibule 197. The collector box 130 is designed to capture additional condensation that builds in the fuel/air mixture. The collector box 130 can have any of a number of components and/or configurations to cover the exiting end of the heat exchanger tubes 120 to collect flue product and transfer it from the heat exchanger tubes 120 to the inducer 140 while maintaining a discrete operating pressure required for combustion and flow.

After the collector box 130, the hot gases then continue on to the inducer 140 in the vestibule 197 and leave the climate control unit 199 through the exhaust vent 145. The inducer 140 typically includes a fan driven by a motor. When the fan of the inducer 140 operates, air moves. Since the inducer 140 is positioned adjacent to the exhaust vent 145 in FIGS. 1A through 1D, the arrangement of the climate control unit 199 in this case is sometimes referred to as a pull-through or induced-air furnace. This is because the inducer 140 pulls or induces the fuel/air mixture from the burner assembly 110, through the heat exchanger tubes 120, and through the collector box 130 before being vented through the exhaust vent 145.

When this process involving the fuel/air mixture is occurring, another fluid (e.g., air) is brought into the main chamber 198 of the climate control unit 199. Once inside the main chamber 198, the fluid comes into contact with the outer surfaces of the heat exchanger tubes 120. In many cases, the heat exchanger tubes 120 are made of a thermally conductive material. In this way, when the hot gases (from the combustion process) travel through the heat exchanger tubes 120, some of the heat from the fuel is transferred to the walls of the heat exchanger tubes 120. Further, as the fluid comes into contact with the outer surface of the walls of the heat exchanger tubes 120, some of the heat captured by the walls of the heat exchanger tubes 120 from the heated fuel is transferred to the fluid in the main chamber 198. The blower assembly 155 is used to pass the fluid in the main chamber 198 over the heat exchanger tubes 120 and send the heated fluid out of the climate control unit 199. The heated fluid can then be used for one or more other processes, such as space heating, or in the case of a water heater, hot water for use in a shower, a clothes washing machine, and/or a dishwashing machine.

In air conditioning mode, the process is modified. Specifically, the combustion process does not occur because the climate control unit 199 is providing air conditioning rather than heating. The air conditioning section of the climate control unit 199 is located upstream of the blower assembly 155. The cool air from the evaporator 119 of the air conditioning section is blown across the exterior of the heat exchanger tubes 120 by the blower assembly 155. The result is that condensation forms inside of the heat exchanger tubes 120, particularly when the ambient environment in which the climate control unit 199 is placed is very hot and/or humid (e.g., in the summertime). Oftentimes, the climate control unit 199 operates in air conditioning mode for months at a time. By contrast, when the climate control unit 199 operates as a heater (as opposed to an air conditioner), heated fluid moves through the heat exchanger tubes 120, preventing any condensation from accumulating inside the heat exchanger tubes 120.

This condensation accumulates inside the heat exchanger tubes 120. As the heat exchanger tubes 120 are often arranged with sloping runs, the condensate that accumulates inside the heat exchanger tubes 120 is gravity-fed to a collection area adjacent to a lower end of the heat exchanger tubes 120. The burners 115 of the burner assembly 110 in this case are exposed (open) to allow some of the condensation (water) to drain from within the heat exchanger tubes 120 when the ambient environment in which the climate control unit 199 is placed is hot, thereby generating a large amount of condensation when the heat exchanger is not in operation because the climate control unit 199 is operating in air conditioning (condensing) mode.

In some cases, as when a climate control unit (e.g., climate control unit 199) has ultra-low $NO_x$ (ULN) emissions, the climate control unit (or components thereof) is configured in such a way that allows for the complete and efficient burning of a fuel (e.g., natural gas) before reaching the heat exchanger tubes (e.g., heat exchanger tubes 120) while also maintaining spacing requirements with respect to the height of the blower shelf (e.g., blower shelf 150). Unfortunately, options are very limited in this regard without the use of example transfer tubes, as discussed below.

Figure 2A:
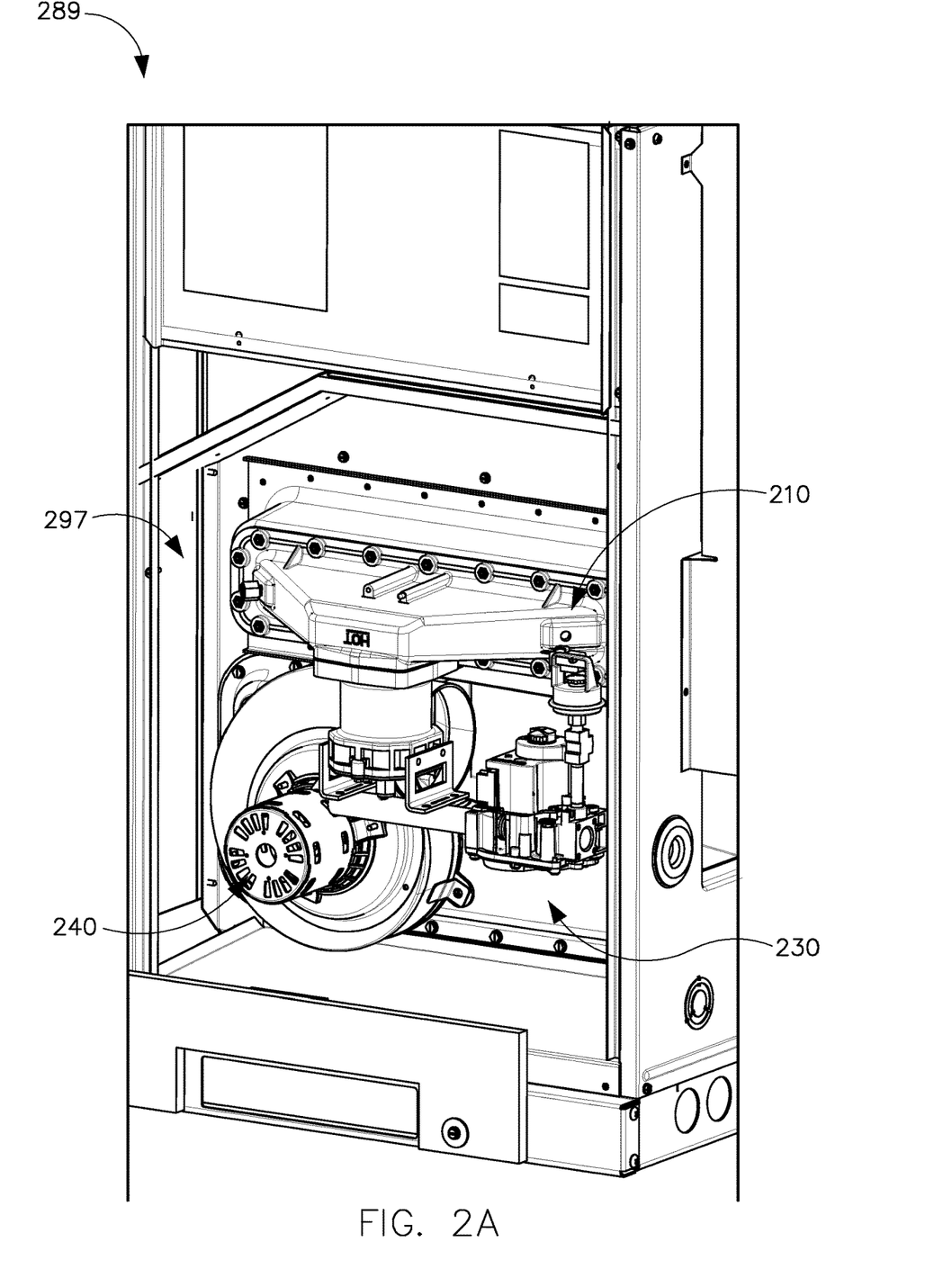
FIGS. 2A through 2C show a non-compliant design of a climate control unit with ultra-low $NO_x$ capability.
Figure 2B:
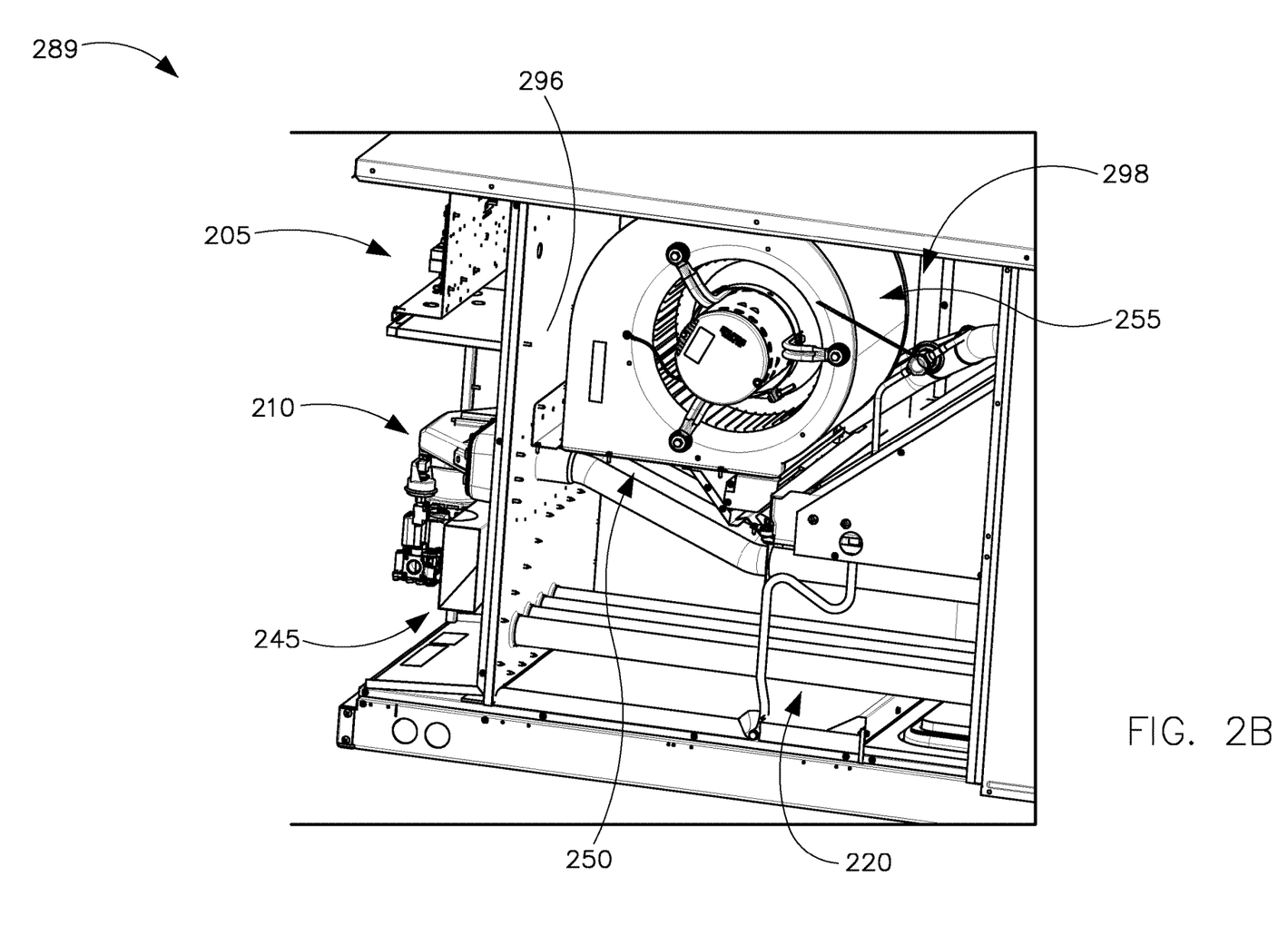
Figure 2C:
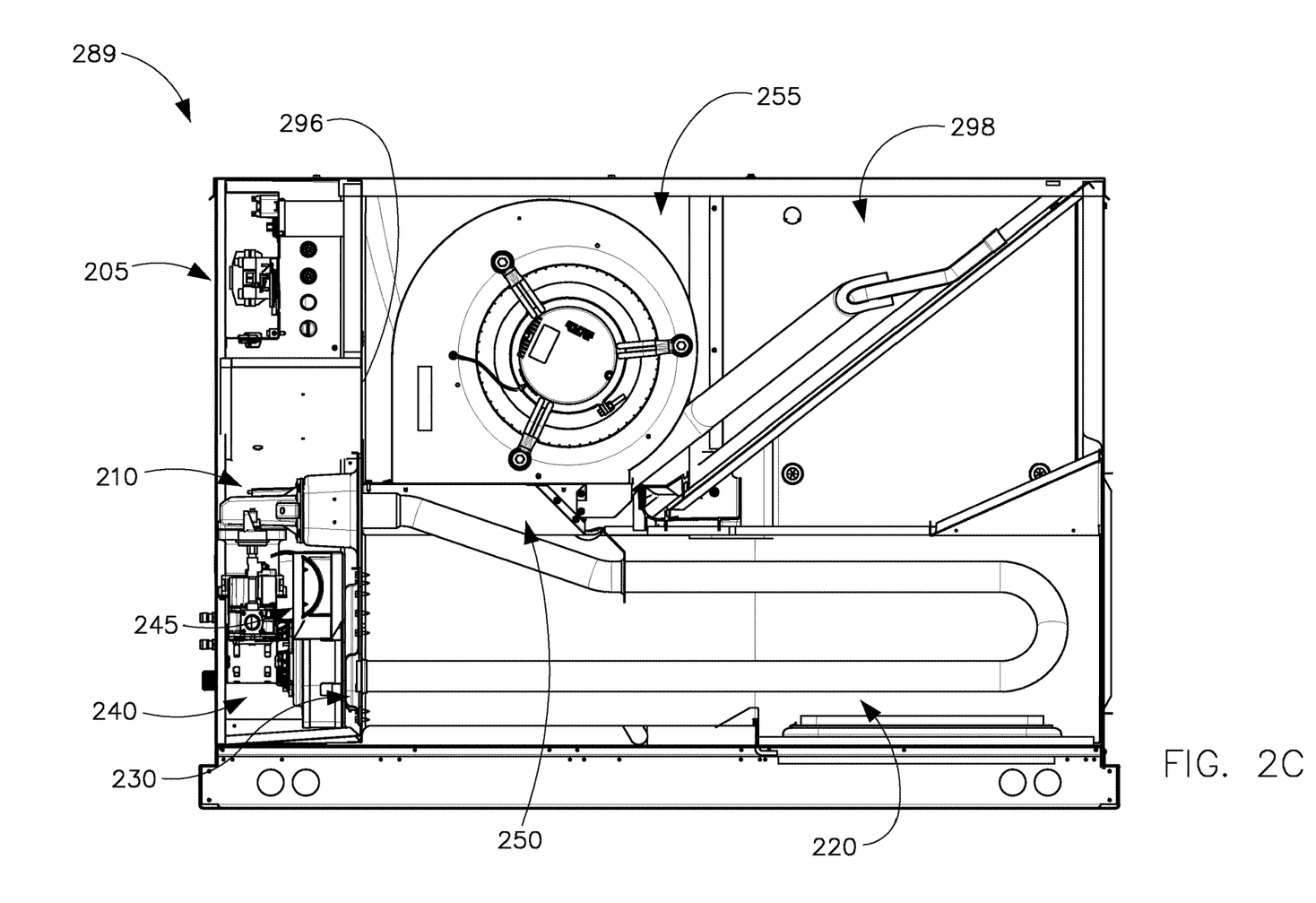

For example, FIGS. 2A through 2C show an example of a climate control unit 289 that is configured with a sealed premix burner system for ULN emissions but that fails to meet spacing requirements and/or other applicable standards. Specifically, FIG. 2A shows a top-front-side perspective view of a portion of an ULN climate control unit 289 that does not include an example transfer tube and fails to meet design specifications. FIG. 2B shows a top-side-rear view of the ULN climate control unit 289. FIG. 2C shows a cross-sectional side view of the ULN climate control unit 289. Referring to FIGS. 1A through 2C, the climate control unit 289 of FIG. 2 has the same components described above for the climate control unit 199 of FIGS. 1A through 1D. For example, the climate control unit 289 of FIGS. 2A through 2C includes an inducer 240, a collector box 230, and a burner assembly 210 disposed in a vestibule 297, where these components correspond to the inducer 140, the collector box 130, and the burner assembly 110 disposed in the vestibule 197 of the climate control unit 199 of FIGS. 1A through 1D.

In this case, however, the premix burner assembly 210 of the climate control unit 289 of FIGS. 2A through 2C is configured differently than the burner assembly 110 of the climate control unit 199 of FIGS. 1A through 1D. Specifically, rather than being open to allow for drainage of condensation that builds in the heat exchanger tubes 220, as with the burner assembly 110 of FIGS. 1A through 1D, the burner assembly 210 of the climate control unit 289 is sealed. This sealed configuration of the burner assembly 210 is effective for controlling the amount of air that mixes with the fuel when the fuel is burned. Also, the fuel is completely burned by the burner assembly 210 of FIGS. 2A through 2C before reaching the heat exchanger tubes 220 of the climate control unit 289. This process optimizes the air/fuel mixture and reduces emissions such as nitrogen oxide, carbon monoxide, and carbon dioxide from flowing through the heat exchanger tubes 120 and being expelled via the inducer 140 into the ambient environment.

Figure 3A:
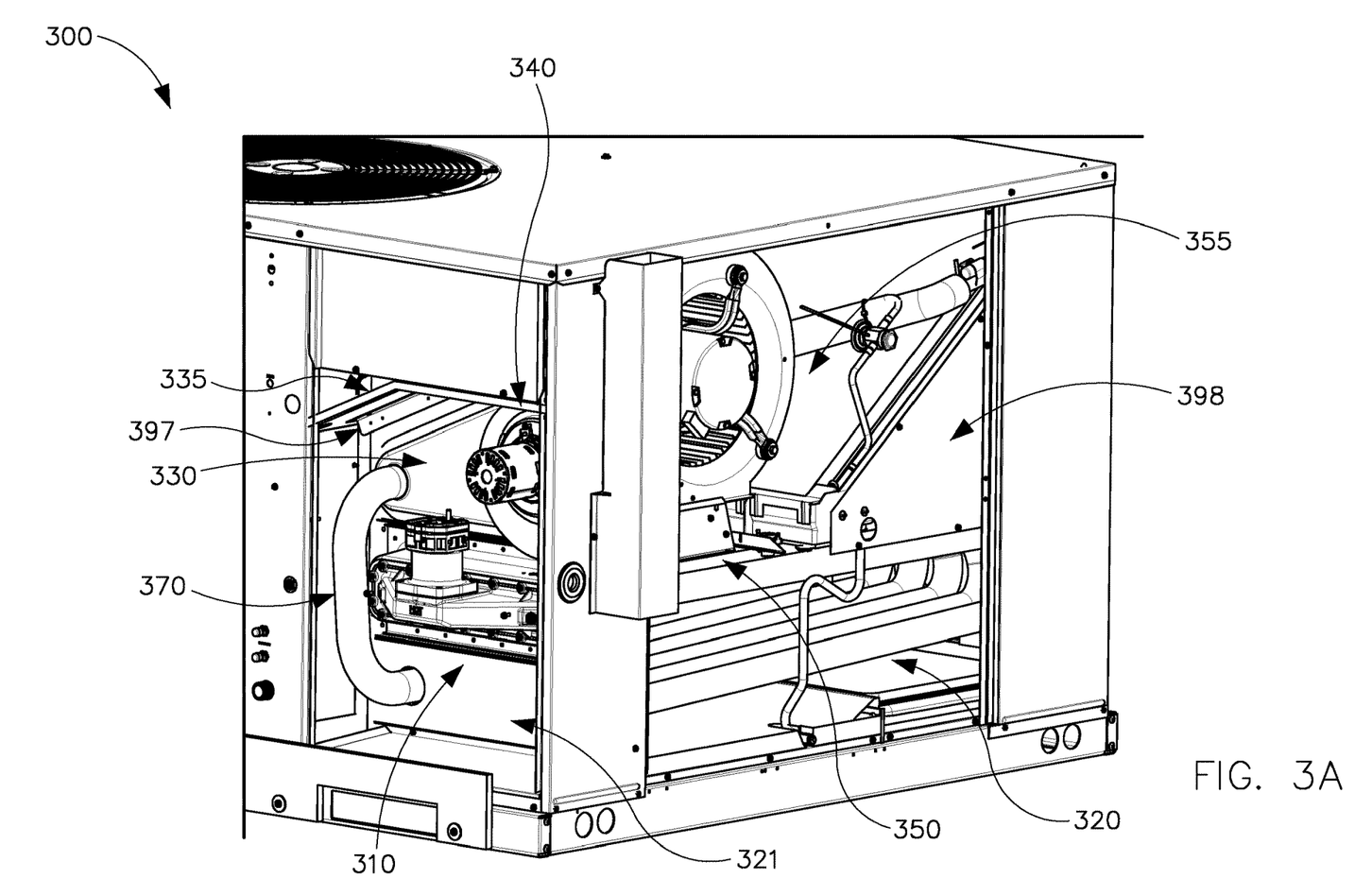
FIGS. 3A through 3C show various views of a climate control unit in accordance with certain example embodiments.
Figure 3B:
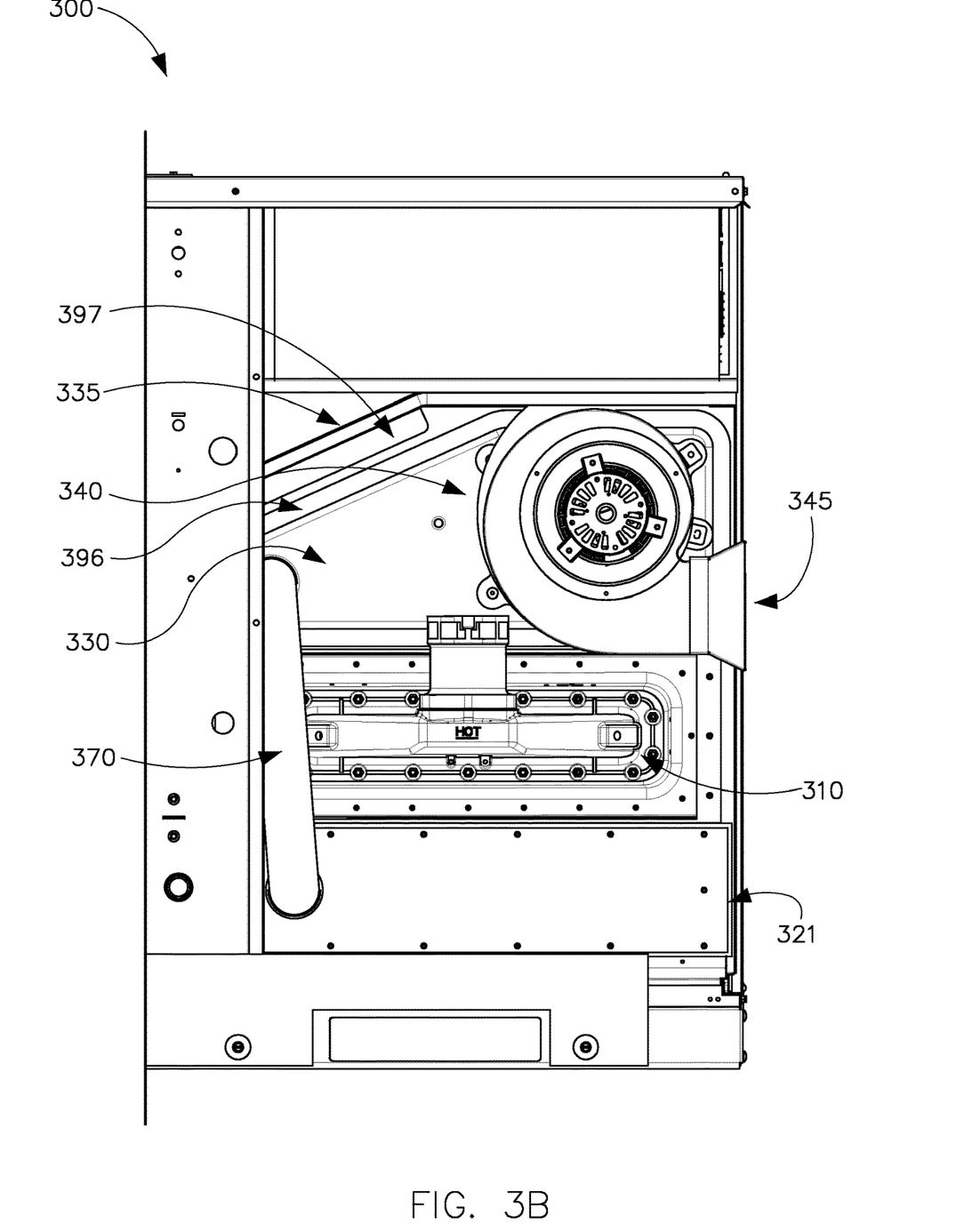
Figure 3C:
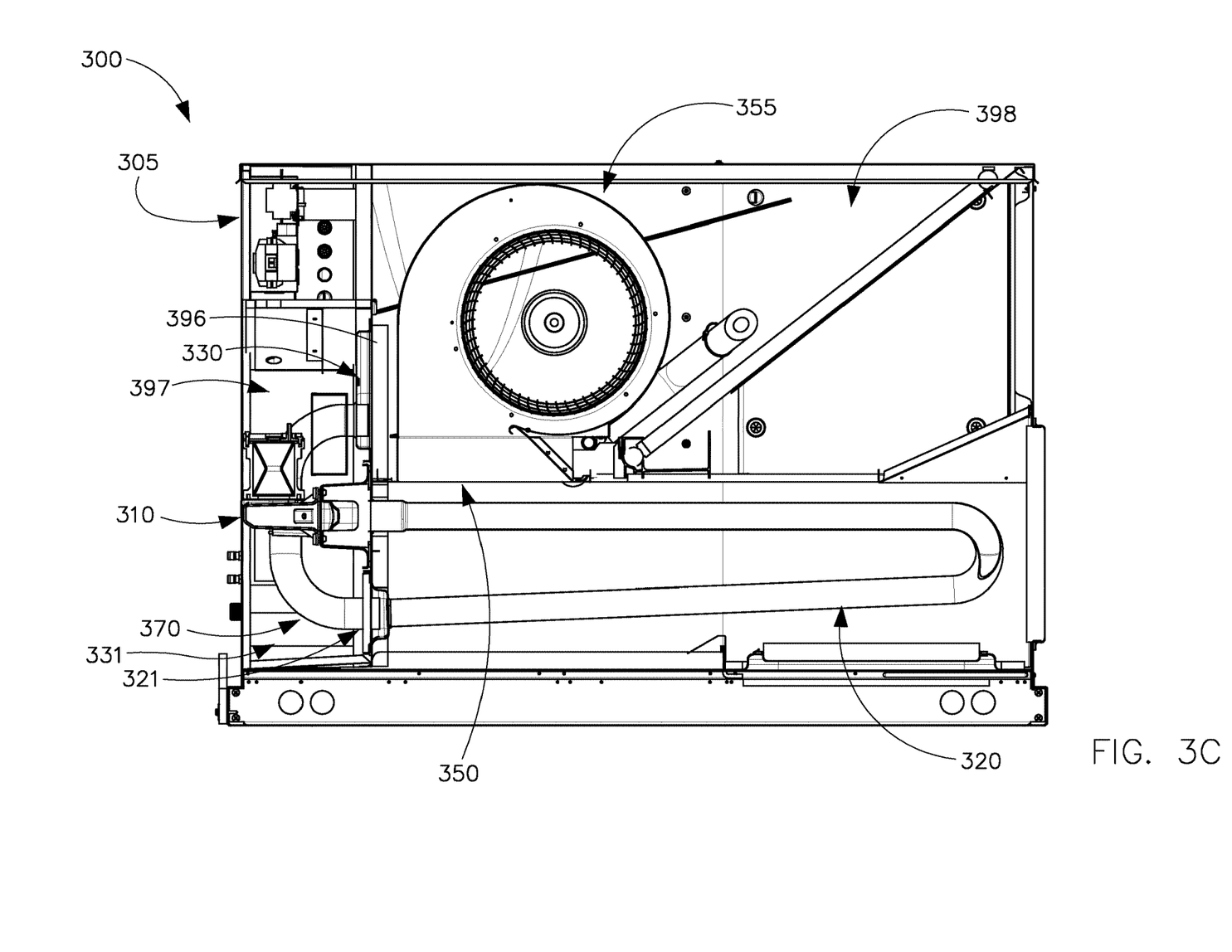

A drawback to this arrangement of FIGS. 2A through 2C, however, is that the burner assembly 210 is relatively bulkier than an open burner assembly (e.g., burner assembly 110) and must be placed higher up in the vestibule 297. One option to account for this is to place the inducer 240 and collector box 230 underneath the burner assembly 210. However, when this occurs, the heat exchanger tubes 220 in the main chamber 298 are positioned, at least in part, above the blower shelf 250. As a result, the blower shelf 250 (and so also the blower) must also be elevated, which increases the overall height of the climate control unit 289. When this occurs, the climate control unit 289 cannot be used in a number of applications and situations because of height restrictions. In this way, an arrangement of components in the main chamber 298 and the vestibule 297 must be engineered without raising the height of the blower shelf 250. As shown in FIGS. 3A through 3C, example transfer tubes allow for this arrangement to be possible.

FIGS. 3A through 3C show various views of climate control unit 300 in accordance with certain example embodiments. Specifically, FIG. 3A shows a top-front-side perspective view of the climate control unit 300. FIG. 3B shows a cross-sectional front view of the climate control unit 300. FIG. 3C shows a cross-sectional side view of the climate control unit 300.

Referring to FIGS. 1A through 3C, the climate control unit 300 of FIGS. 3A through 3C has a number of components that are substantially similar to the components of the climate control unit 199 of FIGS. 1A through 1D. For example, the climate control unit 300 of FIGS. 3A through 3C includes at least one inner wall 396 that divides the interior of the climate control unit 300 into a main chamber 398 and a vestibule 397. The main chamber 398 of the climate control unit 300 is a space in which heat is transferred from one fluid to another. The main chamber 398 of the climate control unit 300 of FIGS. 3A through 3C includes a blower assembly 355, a shelf 350 on which the blower assembly 355 is disposed, and multiple heat exchanger tubes 320.

The vestibule 397 of the climate control unit 300 of FIGS. 3A through 3C includes a burner assembly 310, a collector box 330, an inducer 340, an exhaust vent 345, a barrier 335, and a controller 305. These components are substantially the same as the corresponding components of the climate control unit 199 of FIGS. 1A through 1D discussed above. For example, the barrier 335 separates the controller 305 from the rest of the equipment in the vestibule 397. In this case, however, the burner assembly 310 is sealed, as in FIG. 2, rather than open as in FIGS. 1A through 1D. As discussed above, this configuration of having a sealed burner assembly 210 is commonly used for ULN burners of the burner assembly 310. As a result, the components of the vestibule 397 and the main chamber 398 must be rearranged with respect to the arrangement of FIGS. 1A through 1D.

While the inducer 340 and collector box 330 of the climate control unit 300 remain positioned above the burner assembly 310, the burner assembly 310 has been moved vertically upward relative to what is shown in FIGS. 1A through 1D. As a result, the heated fuel/air mixture leaving the burners of the burner assembly 310 travel down the heat exchanger tubes 320 rather than up the heat exchanger tubes 320, as what is shown in FIGS. 1A through 1D. Condensation that accumulates inside the heat exchanger tubes 320 is gravity-fed to a collector within the header plate 321 at the distal end of the heat exchanger tubes 320. Given the limited amount of space in terms of the footprint of the climate control unit 300, this configuration of components shown in FIGS. 3A through 3C can pose design problems and/or performance issues (e.g., unwanted pressure drop).

To resolve most, if not all, of these issues, one or more example transfer tubes 370 can be added to the climate control unit 300 of FIGS. 3A through 3C. In this case, a single example transfer tube 370 is disposed, at least in part, in the vestibule 397. The transfer tube 370 has one end that is connected (coupled) to the header plate 321 disposed at the return (distal) end of the heat exchanger tubes 320 and another end that is connected (coupled) to the collector box 330. In this way, by using example transfer tubes 370, the process flow of the fuel/air mixture of the climate control unit 300 of FIGS. 3A through 3C can be the same as the process flow of the fuel/air mixture of the climate control unit 199 of FIGS. 1A through 1D, even though the components of the climate control unit 300 are rearranged to allow for ULN capabilities.

The header plate 321 is used to cover the lower collector box 131, which is used to channel the fuel/air mixture flowing through multiple heat exchanger tubes 320 into one end of the example transfer tube 370. The header plate 321 and the lower collector box 331 may be unique to the design of the climate control unit 300. Alternatively, the header plate 321 and the lower collector box 331 can be a standard configuration for the climate control unit 300. In some cases, the header plate 321 and the lower collector box 331 can include one or more features (e.g., a collector, a drain) that allows accumulated water received from the heat exchanger tubes 320 (and, in some cases, also from the transfer tube 370) to drain out of the climate control unit 300 when condensation forms inside of the heat exchanger tubes 320 when the climate control unit 300 is in air conditioning mode and is located in a hot and/or humid environment, such as what is typically encountered during summertime operation.

Also, as discussed above, the collector box 330 can be configured to separate condensation from the fuel-air mixture. In any case, some or all of the condensation accumulated by the collector box 330 can run down the transfer tube 370 to the header plate 321 if the header plate 321 is equipped with a drain or other similar feature to allow the condensation to leave the climate control unit 300. As the climate control unit 300 can be running continuously, the example transfer tube 370 can receive the flow of the fuel/air mixture in one direction and the flow of condensation in the opposite direction simultaneously.

Figure 4:
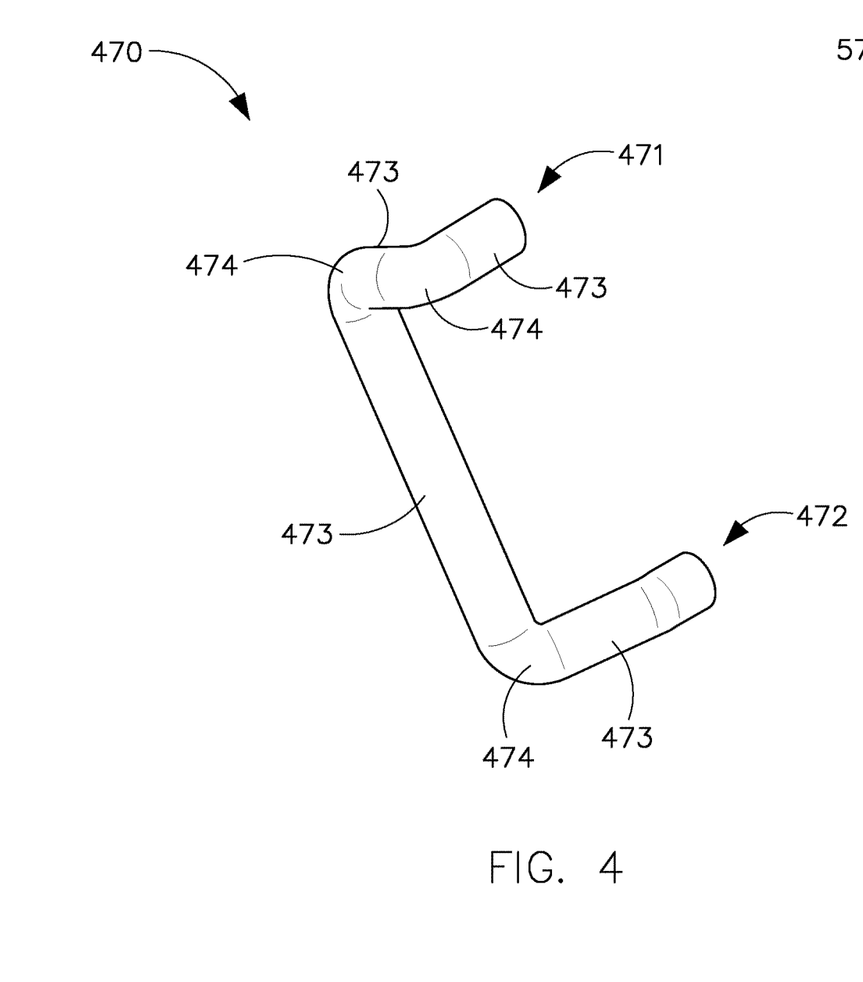
FIG. 4 shows a transfer tube in accordance with certain example embodiments.
Figure 5:
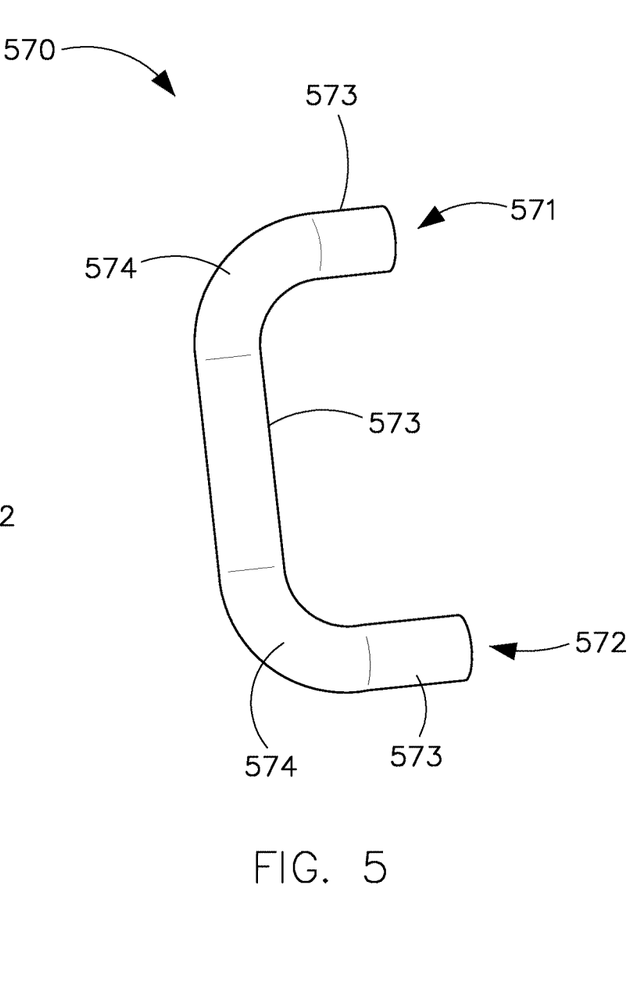
FIG. 5 shows another transfer tube in accordance with certain example embodiments.

As shown in FIGS. 4 and 5 below, example transfer tubes described herein can have any of a number of shapes, sizes, and/or configurations. For example, a transfer tube (e.g., transfer tube 370) can have an overall length (e.g., two inches, four inches), have at least one curved section, and have at least one optional linear section. Since the flue product carried inside the transfer tube 370 is under negative pressure in relation to the vestibule 397 in which the transfer tube 370 is disposed, if a portion of the transfer tube 370 located in the vestibule 397 is punctured, develops a hole, or is otherwise compromised, then any flue product from the combustion of the fuel-air mixture will not leak (or have only minimal leaking). This means that the example transfer tube 370 has a built-in fail-safe feature.

While only a single transfer tube 370 is shown in this example, a climate control unit 300 can have multiple transfer tubes 370. If a climate control unit 300 has multiple transfer tubes 370, then one transfer tube 370 can have the same, or different, configurations (e.g., shape, material, size, number of branches, number of linear sections, number of curved sections, curvature of curved sections) relative to the other transfer tubes 370.

As stated above, example transfer tubes described herein can have any of a number of shapes, sizes, and/or configurations needed or desired to maintain the preferred system pressure required. FIG. 4 shows a transfer tube 470 in accordance with certain example embodiments. FIG. 5 shows another transfer tube 570 in accordance with certain example embodiments. Referring to FIGS. 1A through 5, the transfer tube 470 of FIG. 4 is non-planar. The bottom end 472 of the transfer tube 470 has a linear section 473, which then transitions to a curved section 474 (which in this case forms an approximately 90° bend), which then transitions to another linear section 473, which then transitions to a curved section 474 (which in this case forms an approximately 90° bend in a different plane), which then transitions to another linear section 473, which then transitions to a curved section 474 (which in this case forms an approximately 90° bend in a different plane), which then finishes with another linear section 473 at the top end 471.

The transfer tube 570 of FIG. 5 forms a planar U-shape. Specifically, the bottom end 572 of the transfer tube 570 begins with a linear section 573, which then transitions to a curved section 574 (which in this case forms an approximately 90° bend), which then transitions to another linear section 573, which then transitions to another curved section 574 (which in this case forms an approximately 90° bend in the same plane), which then finishes with another linear section 573 at the top end 571. Each linear section (e.g., linear section 573) of a transfer tube (e.g., transfer tube 570) can have any length, thickness, squareness of edges, and/or other characteristics. Similarly, each curved section (e.g., curved section 574) of a transfer tube (e.g., transfer tube 570) can have any length, thickness, number of bends (e.g., one, three), radius of a bend, squareness of edges, and/or other characteristics.

In certain example embodiments, a transfer tube can have other sections not shown in FIGS. 3A through 5. For example, part of a transfer tube can include a junction (e.g., a T-junction, a Y-junction, a cross junction) that leads to multiple branches. In such a case, a transfer tube can have three or more ends that can couple to different components of a heat exchanger of a climate control unit. For instance, a climate control unit can have multiple collector boxes (e.g., collector box 330, collector box 332) and/or multiple header plates 321. In such a case, a single transfer tube with 3 or more ends can be used. Alternatively, multiple transfer tubes (e.g., each with two ends, each with four ends) can be used in a single climate control unit. In such a case, one transfer tube can have the same, or different, shape, size, and/or configuration relative to the shape, size, and/or configuration of one or more of the other transfer tubes of the climate control unit.

The cross-sectional shape of an example transfer tube described herein can have one or more of any of a number of shapes along the length of the transfer tube. Examples of such shapes can include, but are not limited to, a circle (as in the examples shown above with respect to FIGS. 3A through 5), square, octagonal, triangular, oval, and random. The cross-sectional area of an example transfer tube can be substantially uniform or variable along its length. Each end (e.g., bottom end 472, top end 571) of an example transfer tube can include one or more coupling features (e.g., mating threads).

An example transfer tube described herein can be used in climate control units having certain configurations that accumulate condensation without an effective manner in draining such condensation. An example of such a climate control unit is a furnace that has ULN capability using a sealed burner assembly. Example transfer tubes can be used to move a combustion product (e.g., a fuel/air mixture) from below the burner assembly of the heat exchanger to a collector box located above the burner assembly. When an example transfer tube is located inside the vestibule of the climate control unit, the transfer tube can have inherent fail-safe functionality in the event that the transfer tube is compromised. The example transfer tubes help to drain condensation that builds in air conditioning mode when the cold air is passed over a hot heat exchanger tubes in summer months or when heating the fuel/air mixture in a heat exchange process of the heat exchanger.

By carefully engineering the placement and the various characteristics of each transfer tube, the transfer tube can provide a number of benefits, including but not limited to higher efficiency, more consistent pressure, lower costs, and less waste. Example HX tubes can allow a climate control unit to comply with any applicable standards and/or regulations. Example embodiments can be mass produced or made as a custom order. Example embodiments can be used in newly-manufactured climate control units or in retrofitting existing climate control units.

Accordingly, many modifications and other embodiments set forth herein will come to mind to one skilled in the art to which example transfer tubes pertain having the benefit of the teachings presented in the foregoing descriptions and the associated drawings. Therefore, it is to be understood that example transfer tubes are not to be limited to the specific embodiments disclosed and that modifications and other

What is claimed is:

1. A thermal transfer device comprising:
a main chamber comprising:
a plurality of heat exchanger tubes through which a first fluid flows,
wherein each heat exchanger tube comprises an entrance and an exit; and a blower assembly that blows a second fluid across the plurality of heat exchanger tubes; and
a vestibule disposed adjacent to the main chamber, wherein the vestibule comprises:
an inducer;
a burner assembly coupled to the entrance of the plurality of heat exchanger tubes;
a collector box configured to receive the first fluid and remove condensation from the first fluid;
a transfer tube comprising at least one wall having a first inner surface and a first outer surface, wherein the first inner surface forms a first cavity, wherein the at least one wall further has a first end and a second end; and
a header plate and an additional collector box disposed at the exit of the plurality of heat exchanger tubes,
wherein the first end of the transfer tube is directly coupled to the header plate,
wherein the second end of the transfer tube is directly coupled to the collector box,
wherein the transfer tube provides the first fluid to the collector box, and
wherein the transfer tube transports the condensation from the collector box to a drain proximate to the exit of the at least one of the plurality of heat exchanger tubes.

2. The thermal transfer device of claim 1, wherein first cavity formed by the at least one wall of the transfer tube is configured to have a negative pressure relative to a pressure of the main chamber and the vestibule.

3. The thermal transfer device of claim 1, wherein the first fluid comprises a fuel, and wherein the second fluid comprises air.

4. The thermal transfer device of claim 1, wherein the burner assembly is disposed between the inducer and the exit of the plurality of heat exchanger tubes, and wherein the blower assembly is disposed above the inducer.

5. The thermal transfer device of claim 1, wherein the inducer is configured to pull the first fluid through the plurality of heat exchanger tubes, through the transfer tube, and through the collector box.

6. A thermal transfer device comprising:
a main chamber comprising:
a plurality of heat exchanger tubes through which a first fluid flows, wherein each heat exchanger tube comprises an entrance and an exit; and
a blower assembly that blows a second fluid across the plurality of heat exchanger tubes; and
a vestibule disposed adjacent to the main chamber, wherein the vestibule comprises: an inducer;
a burner assembly coupled to the entrance of the plurality of heat exchanger tubes;
a collector box disposed above the burner assembly, the collector box configured to receive the first fluid and remove condensation from the first fluid; and
a transfer tube comprising at least one wall having a first inner surface and a first outer surface, wherein the first inner surface forms a first cavity, wherein the at least one wall further has a first end and a second end,
wherein the first end of the transfer tube is directly coupled to the exit of at least one of the plurality of heat exchanger tubes,
wherein the second end of the transfer tube is directly coupled to the collector box,
wherein the transfer tube provides the first fluid to the collector box, and wherein the transfer tube transports the condensation from the collector box to a drain proximate to the exit of the at least one of the plurality of heat exchanger tubes.

7. The thermal transfer device of claim 6, wherein first cavity formed by the at least one wall of the transfer tube is configured to have a negative pressure relative to a pressure of the main chamber and the vestibule.

8. The thermal transfer device of claim 6, wherein the vestibule further comprises:
a header plate and an additional collector box disposed at the exit of the plurality of heat exchanger tubes, wherein the first end of the transfer tube is coupled to the header plate.

9. The thermal transfer device of claim 6, wherein the first fluid comprises a fuel, and wherein the second fluid comprises air.

10. The thermal transfer device of claim 6, wherein the blower assembly is disposed above the inducer.

11. The thermal transfer device of claim 6, wherein the inducer pulls the first fluid through the plurality of heat exchanger tubes, through the transfer tube, and through the collector box.

* * * * *